Sept. 7, 1926.  
L. B. SMYSER  
1,598,623  
AUTOMOBILE STEERING MECHANISM LOCK  
Filed July 29, 1924   3 Sheets-Sheet 1
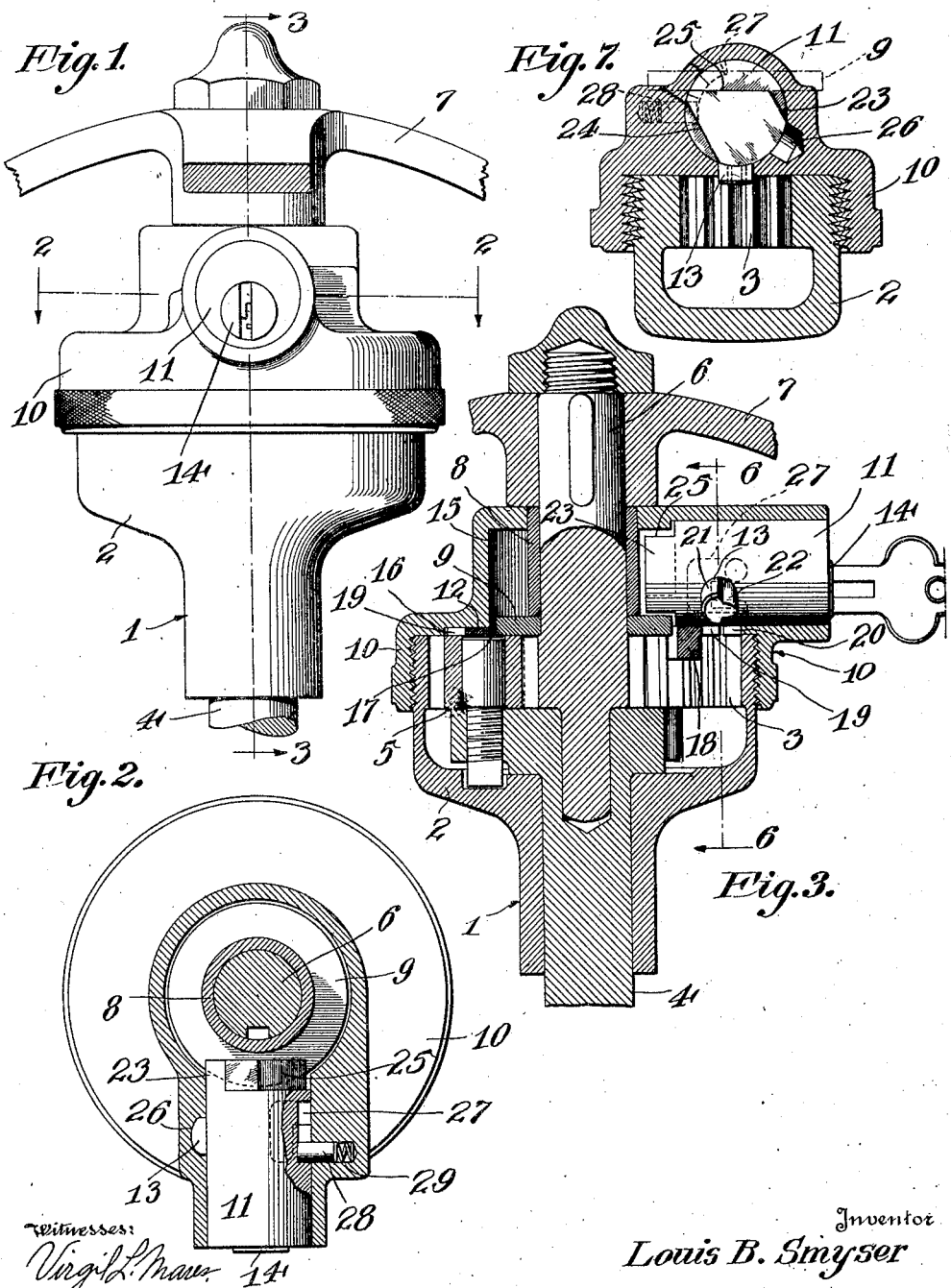
Inventor  
Louis B. Smyser  
By Joshua R. H. Potts  
His Attorney

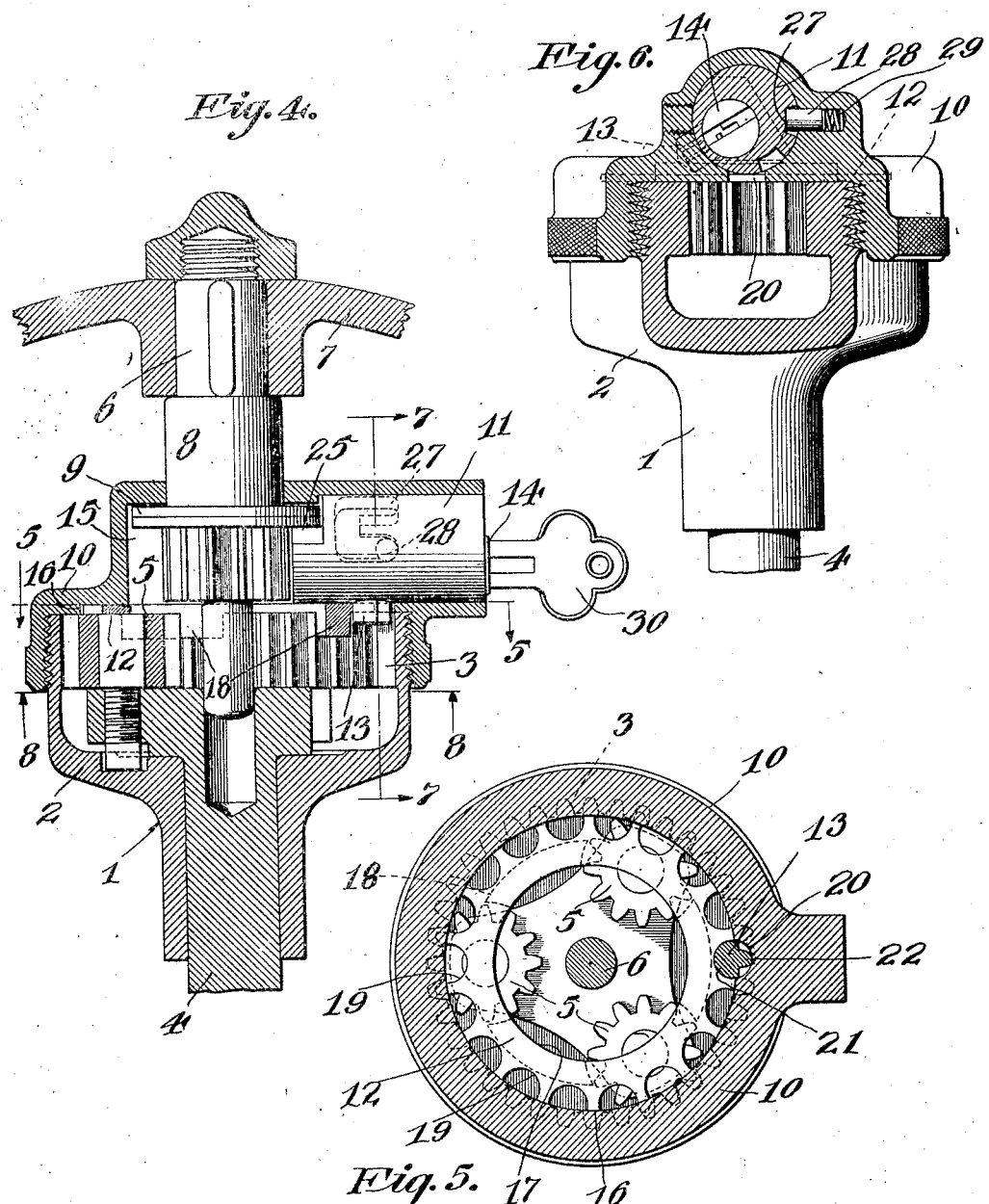

Sept. 7, 1926. 1,598,623
L. B. SMYSER
AUTOMOBILE STEERING MECHANISM LOCK
Filed July 29, 1924 3 Sheets-Sheet 3
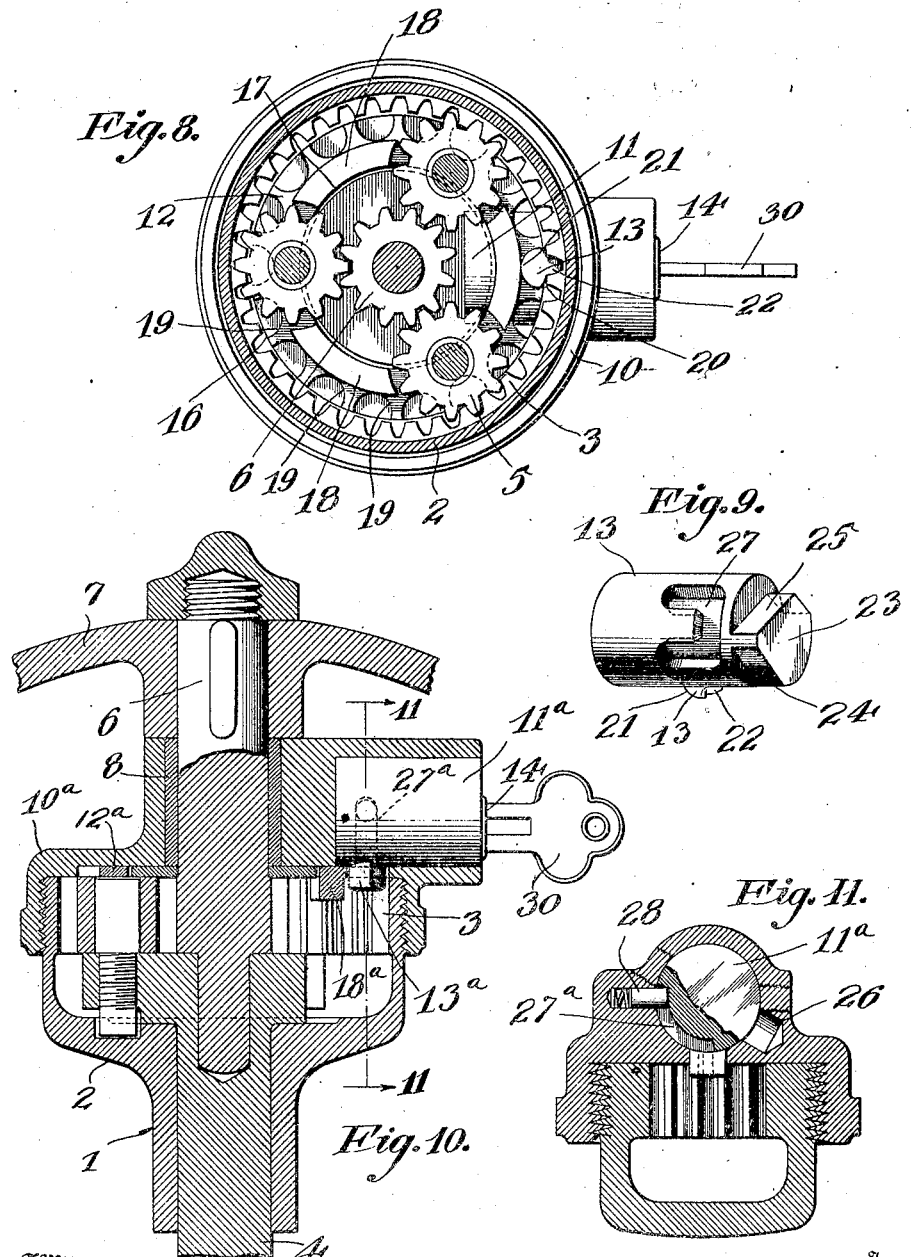

Patented Sept. 7, 1926.

1,598,623

UNITED STATES PATENT OFFICE.

LOUIS B. SMYSER, OF PHILADELPHIA, PENNSYLVANIA.

AUTOMOBILE STEERING-MECHANISM LOCK.

Application filed July 29, 1924. Serial No. 728,815.

My invention relates to locks for automobiles and its objects are to provide a lock of simple and durable construction which, by the manipulation of a single unit, will lock the steering mechanism at three points, namely, the steering shaft out of operative connection from the remainder of the steering mechanism, the remaining steering mechanism against movement, and the cap which covers the steering mechanism to the housing which encloses the same; to provide a lock which may be readily modified to lock the steering mechanism at either one or two of the above points, and which may be applied to the regular steering mechanism by changing but one of its parts.

These objects, and other advantageous ends which will be described hereinafter, I attain in the following manner, reference being had to the accompanying drawings in which Figure 1 is a side elevation of a steering mechanism having my improved lock applied thereto, Figure 2 a section on line 2—2 of Figure 1, Figure 3 a section on line 3—3 of Figure 1, Figure 4 a view similar to Figure 3 illustrating the parts moved into another position, Figure 5 a section on line 5—5 of Figure 4, Figure 6 a section on line 6—6 of Figure 3, Figure 7 a section on line 7—7 of Figure 4, Figure 8 a section on line 8—8 of Figure 4, Figure 9 a perspective view of an element which forms a part of my invention, Figure 10 a vertical section through a modified form of the lock shown in Figure 3, and Figure 11 a section on line 11—11 of Figure 10.

Referring to the drawings, 1 indicates an ordinary steering mechanism which includes a housing 2 having an annular gear 3, a steering post 4 rotatable in the housing, pinions 5 rotatable about the post and meshing with the gear, a steering shaft 6 having teeth on one end in mesh with the pinions, a steering wheel 7 secured to the other end of the shaft, a bushing 8 secured to the shaft and a flange 9 secured to the shaft for holding the pinions in position on the steering post.

My improved lock is substituted for the usual cap which is a part of the housing and includes a cap 10 screwed onto the regular housing and forming a part thereof, a cylinder 11 mounted to slide lengthwise in the cap into position for holding shaft 6 in mesh or out of mesh with the pinions and to oscillate into locking and unlocking position, a disk 12 rotatably mounted in the cap and adapted to hold the pinions against rotation, a plunger 13 slidable in the wall of the cylinder for locking the cylinder, the disk, and the cap to annular gear 3, and a suitable locking plug 14 mounted in the cylinder and connected with the plunger for moving it into and out of cylinder 11.

Cap 10 is provided with a cavity 15 to allow flange 9 to pass upwardly when shaft 6 is moved out of mesh with the pinions. Disk 12 is mounted in a recess 16 in the cap and is provided with a central opening 17, preferably coinciding with cavity 15, to allow movement of flange 9. Lugs 18, depending from the under side of disk 12 between pinions 5, are adapted to hold the pinions against movement when disk 12 is locked to the housing. Plunger 13 locks disk 12 to the housing by engaging within one of the notches 19 in the periphery of the disk, when in registry with a notch 20 in the cap. Plunger 13 is provided with an arcuate surface 21 for engagement with notches 19 and a tooth 22 for engagement with notch 20 and the teeth of annular gear 3. Cylinder 11 is provided with an angular head 23 having a face 24 adapted to be disposed over flange 9 for keeping shaft 6 in mesh with the pinions as shown in Figure 3, and a face 25 adapted to engage the under side of flange 9 to hold shaft 6 out of mesh from the pinions as shown in Figure 4. To allow flange 9 to pass upward within cavity 15, head 23 is moved out of the cavity by withdrawing plunger 13 from hole 26 and sliding cylinder 11 outward. Head 23 will then be out of cavity 15 to allow flange 9 to move upward. After shaft 6 is raised out of mesh with pinions 5, and flange 9 is in the upper part of cavity 15, head 23 is brought back into the cavity to hold flange 9 in the raised position, by turning cylinder 11 to the left to bring plunger 13 in line with notches 19 and 20 and the teeth of gear 3, and sliding the cylinder into cap 10, so that face 25 of the head will engage the under side of flange 9 and hold it in position. The sliding of the cylinder into the cap 10 brings the plunger into registry with notches 19 and 20 and the teeth of annular gear 3. To accurately move head 23 and plunger 13 into the various positions, means must be provided for accurately guiding the cylinder and head in the various movements. I preferably provide a U-shaped guiding groove 27 in cylinder 11 and a pin 28, in the cap, projecting into the groove. The pin may be secured to the cap in any suitable manner such as shown at 29 in Figure 2.

In cap 10ª in Figures 10 and 11, the cavity 15 in cap 10, shown in Figure 3, is omitted and upward movement of shaft 5 and flange 9 is prevented. In this form the disk 12ª functions with a plunger 13ª to lock the steering mechanism against movement. Cylinder 11ª has a straight guiding groove 27ª instead of a U-shaped groove. In all other respects the construction of this form is like that shown in Figure 3.

To lock the steering mechanism a key 30 is inserted in plug 14 to withdraw plunger 13 from hole 26 into cylinder 11. The key is then pulled to slide the cylinder outward in cap 10 and bring head 23 out of cavity 15. The cylinder is guided in this movement by one leg of the U-shaped guiding groove 27 and pin 28. Shaft 6 is then raised until it is out of mesh with pinions 5 and flange 9 is within the upper part of cavity 15. Cylinder 11 is then turned and slid into the cap to bring head 23 under flange 9 and plunger 13 between notches 19 and 20 and between the teeth of annular groove 3. Cylinder 11 is guided in this movement by the U-shaped groove 27 and pin 28. The steering mechanism is then locked at three points, namely, shaft 6 is out of operative connection with the remainder of the steering mechanism, disk 12 is locked by plunger 13 and its lugs 18 hold pinions 5 against movement, and cap 10 is locked to annular gear 3 by the plunger engaging notch 20 and the teeth of annular gear 3. The key is then removed. To manipulate the lock for rendering the steering mechanism operative the key is inserted in tumbler 11 and turned to withdraw plunger 13 from between the teeth of annular gear 3 and notches 19 and 20. The key is then pulled to slide cylinder 11 outward and bring head 23 from under flange 9. Shaft 6 will then drop into mesh with the pinions. Cylinder 11 is then turned and slid inward to bring head 23 over flange 9 and plunger 13 within hole 26. Faces 24 and 25 on head 23 may vary in position or may be dispensed with and head 23 made cylindrical and of such size as to fit over flange 9 when in one position and under flange 9 when in the other position.

To manipulate the modified form shown in Figure 10, key 30 is inserted in tumbler 14 and turned to bring plunger 13ª from hole 26 into registry with notches 19 and 20 and between the teeth of annular gear 3, and the mechanism locked against turning by disk 10ª and depending lugs 18ª which engage the pinions.

With the lock above set forth, manipulation of a single unit will lock the steering mechanism at three points and the lock may be readily changed so as to lock the steering mechanism in either one or two points.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In steering mechanism having a housing, a post and a shaft geared to the post and adapted to be moved out of mesh with the gearing; means mounted to slide in the housing into position for holding the shaft in or out of mesh, and to oscillate into unlocking and locking position, and means for locking said means in either position.

2. In steering mechanism having a housing, a post and a shaft geared to the post and adapted to be moved out of mesh with the gearing; a cylinder mounted to slide lengthwise in the housing into position for holding the shaft in or out of mesh, and to oscillate into unlocking and locking position, and means for locking the cylinder in either position.

3. In steering mechanism having a housing, a post and a shaft geared to the post and adapted to be moved out of mesh with the gearing; means mounted to slide in the housing into position for holding the shaft in or out of mesh, and to oscillate into unlocking and locking position; a plunger mounted in said means for locking it in either position, and means for moving the plunger.

4. In steering mechanism having a housing, a post and a shaft geared to the post and adapted to be moved out of mesh with the gearing; a cylinder mounted to slide in the housing into position for holding the shaft in or out of mesh, and to oscillate into unlocking and locking position; a plunger mounted in the cylinder for locking it in either position, and means for moving the plunger.

5. In steering mechanism having a housing, a post and a shaft geared to the post and adapted to be moved out of mesh with the gearing; a cylinder mounted to oscillate in the housing into unlocking and locking position and to slide lengthwise; means on the end of the cylinder adapted to be moved, by sliding the cylinder, into position for holding the shaft in or out of mesh, and means for locking the cylinder in either position.

6. In steering mechanism having a housing, a post and a shaft geared to the post and adapted to be moved out of mesh with the gearing; a cylinder mounted to oscillate in the housing into unlocking and locking position and to slide lengthwise; a head on the end of the cylinder adapted to be moved, by sliding the cylinder, into position for holding the shaft in or out of mesh, and means for locking the cylinder in either position.

7. In steering mechanism having a housing, a post and a shaft geared to the post and adapted to be moved out of mesh with the gearing; a cylinder mounted to oscillate in the housing into unlocking and locking position and to slide lengthwise; an angular head on the end of the cylinder adapted to be moved, by sliding the cylinder, into position for holding the shaft in or out of mesh, and means for locking the cylinder in either position.

8. In steering mechanism having a housing, a post and a shaft geared to the post and adapted to be moved out of mesh with the gearing; a cylinder mounted to oscillate in the housing into unlocking and locking position and to slide lengthwise; a head on the end of the cylinder adapted to be moved, by sliding the cylinder, into position for holding the shaft in or out of mesh; means for guiding the head into position, and means for locking the cylinder in either position.

9. In steering mechanism having a housing, a post and a shaft geared to the post and adapted to be moved out of mesh with the gearing; a cylinder, having a guiding groove, mounted to oscillate in the housing into unlocking and locking position and to slide lengthwise; a head on the end of the cylinder adapted to be moved, by sliding the cylinder, into position for holding the shaft in or out of mesh; means in the housing co-operating with the guiding groove for guiding the head into position, and means for locking the cylinder in either position.

10. In steering mechanism having a housing, a post and a shaft geared to the post and adapted to be moved out of mesh with the gearing; a cylinder, having a U-shaped guiding groove, mounted to oscillate in the housing into unlocking and locking position and to slide lengthwise; a head on the end of the cylinder adapted to be moved, by sliding the cylinder, into position for holding the shaft in or out of mesh; means in the housing co-operating with the guiding groove for guiding the head into position, and means for locking the cylinder in either position.

11. In steering mechanism having a housing, a post and a shaft geared to the post and adapted to be moved out of mesh with the gearing; a cylinder, having a U-shaped guiding groove, mounted to oscillate in the housing into unlocking and locking position and to slide lengthwise; a head on the end of the cylinder adapted to be moved, by sliding the cylinder, into position for holding the shaft in or out of mesh; a pin in the housing projecting into the groove for guiding the head into either position, and means for locking the cylinder in position.

12. In a steering mechanism a housing having a recess; a post rotatable in the housing; a shaft geared to the post and adapted to be moved out of mesh with the gearing; a disk rotatably fitting in the recess; means for transmitting movement from the post to the disk, and means for locking the disk to the housing.

13. In a steering mechanism provided with a housing having a recess, a post, and a shaft geared to the post and adapted to be moved out of mesh with the gearing; a disk having notches in its periphery rotatably fitting in the recess; means for transmitting movement from the post to the disk, and means slidable in the housing substantially at right angles to the plane of the disk and adapted to engage within the notches for locking the disk to the housing.

14. In a steering mechanism provided with a housing having a recess, a post, and a shaft geared to the post and adapted to be moved out of mesh with the gearing; a disk, rotatably fitting in the recess, having notches in its periphery; lugs depending from its side and an opening in its center through which the shaft is adapted to be moved; means connected with the post adapted to engage the lugs and move the disk, and means movable through the recess adapted to engage the notches for locking the disk to the housing.

15. In steering mechanism having a housing, a post rotatable in the housing, a cap secured to the housing, and a shaft, rotatable in the cap, geared to the post and adapted to be moved out of mesh with the gearing; means mounted to oscillate in the cap into unlocking and locking position and to slide into position for holding the shaft in or out of mesh, and common means for locking said means and cap to the housing.

16. In steering mechanism having a housing, a post rotatable in the housing, a cap secured to the housing, and a shaft, rotatable in the cap, geared to the post and adapted to be moved out of mesh with the gearing; means mounted to oscillate in the cap into unlocking and locking position and to slide into position for holding the shaft in or out of mesh; means movably mounted in the housing, adapted to hold the gearing against movement, and means for locking the first named means, the last named means and the cap to the housing.

17. In steering mechanism having a housing, a post rotatable in the housing, a cap secured to the housing, and a shaft, rotatable in the cap, geared to the post and adapted to be moved out of mesh with the gearing; means mounted to oscillate in the cap into unlocking and locking position and to slide into position for holding the shaft in or out of mesh; means movably mounted in the housing, adapted to hold the gearing against movement, and common means for locking the first named means, the last named means and the cap to the housing.

18. In steering mechanism having a housing, a post rotatable in the housing, a cap secured to the housing and a shaft, rotatable in the cap, geared to the post and adapted to be moved out of mesh with the gearing; means mounted to oscillate in the cap into unlocking and locking position and to slide into position for holding the shaft in or out of mesh; means movably mounted in the housing, adapted to hold the gearing against movement, and a plunger for locking the first named means, the last named means and the cap to the housing.

19. In steering mechanism having a housing provided with an annular gear, a post rotatable in the housing, pinions rotatable about the post and meshing with the gear, and a shaft in mesh with the pinions; pinion holding means rotatable in the housing, and means movable in the housing and relatively to said pinion holding means for locking the pinion holding means directly to the gear.

20. In steering mechanism having a housing provided with an annular gear, a post rotatable in the housing, pinions rotatable about the post and meshing with the gear, a cap secured to the housing, and a shaft rotatable in the cap and meshing with the pinions; pinion holding means rotatable in the housing, and means movable in the cap and relatively to the pinion holding means for locking the pinion holding means and the cap directly to the gear.

21. In steering mechanism having a housing provided with an annular gear, a post rotatable in the housing, pinions rotatable about the post and meshing with the gear, and a shaft rotatable in the housing, meshing with the pinions and adapted to be moved out of mesh; means mounted to slide and to oscillate in the housing into position for holding the shaft in or out of mesh, and means adapted to lock said first mentioned means in either position and be disposed in the path of the pinions.

In testimony whereof I have signed my name to this specification.

LOUIS B. SMYSER.